US012760891B2

(12) United States Patent
Akagi et al.

(10) Patent No.: US 12,760,891 B2
(45) Date of Patent: Oct. 13, 2026

(54) COMBUSTION GAS COOLING DEVICE

(71) Applicant: MITSUBISHI HEAVY INDUSTRIES, LTD., Tokyo (JP)

(72) Inventors: Shohei Akagi, Tokyo (JP); Shimpei Todaka, Tokyo (JP); Daisuke Mukai, Kanagawa (JP); Hiroshi Kako, Kanagawa (JP); Tomoaki Isobe, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 520 days.

(21) Appl. No.: 18/288,129

(22) PCT Filed: May 30, 2022

(86) PCT No.: PCT/JP2022/021864
§ 371 (c)(1),
(2) Date: Oct. 24, 2023

(87) PCT Pub. No.: WO2022/270232
PCT Pub. Date: Dec. 29, 2022

(65) Prior Publication Data
US 2024/0210031 A1 Jun. 27, 2024

(30) Foreign Application Priority Data
Jun. 25, 2021 (JP) ................................ 2021-105909

(51) Int. Cl.
*F23J 15/00* (2006.01)
*B01D 53/86* (2006.01)

(52) U.S. Cl.
CPC ........ *F23J 15/006* (2013.01); *B01D 53/8631* (2013.01); *B01D 2257/404* (2013.01)

(58) Field of Classification Search
CPC .................................................. F23J 2219/10
See application file for complete search history.

(56) References Cited

U.S. PATENT DOCUMENTS 4,131,432 A * 12/1978 Sato .................... F01N 13/0097 422/177
5,555,718 A * 9/1996 Anderson .......... B01D 53/8631 60/39.182

(Continued)

FOREIGN PATENT DOCUMENTS

JP 2010-0031869 A 2/2010
JP 2011-038517 A 2/2011

(Continued)

OTHER PUBLICATIONS

International Search Report dated Jul. 26, 2022, issued in counterpart Application No. PCT/JP2022/021864, with partial English translation. (6 pages).

(Continued)

*Primary Examiner* — David P. Olynick
(74) *Attorney, Agent, or Firm* — WHDA, LLP

(57) ABSTRACT

The present disclosure comprises: a mixing duct equipped with an inlet through which combustion gas flows in and an outlet through which the combustion gas flowing in from the inlet flows out; a cooling duct that allows cooling gas, which has a lower temperature than the combustion gas, to flow out into the mixing duct, and generates a mixed gas consisting of the combustion gas and the cooling gas; and an expansion duct equipped with an inlet that is connected to the mixing duct and through which the mixed gas flows in and an outlet through which the mixed gas flowing in from the inlet flows out. The mixing duct has a shape with an equal cross-sectional area at each position from the inlet to the outlet. The expansion duct provides a denitrification device having a shape, the cross-sectional area of which gradually expands from the inlet to the outlet.

8 Claims, 10 Drawing Sheets

(56) References Cited

U.S. PATENT DOCUMENTS

| | | | | |
|---|---|---|---|---|
| 9,644,511 | B2 | 5/2017 | Miyanishi et al. | |
| 9,850,818 | B2 * | 12/2017 | Kulkarni | F01N 3/2066 |
| 9,890,672 | B2 | 2/2018 | Miyanishi et al. | |
| 10,060,316 | B2 * | 8/2018 | Reed | F02C 6/08 |
| 2010/0024379 | A1 | 2/2010 | Sengar et al. | |
| 2011/0036066 | A1 | 2/2011 | Zhang et al. | |
| 2015/0330274 | A1 * | 11/2015 | Miyanishi | F01N 3/0205<br>60/274 |
| 2015/0337700 | A1 | 11/2015 | Miyanishi et al. | |
| 2016/0376994 | A1 * | 12/2016 | Kulkarni | F01N 3/2066<br>60/39.5 |
| 2017/0058742 | A1 * | 3/2017 | Zhang | F01N 3/2066 |
| 2017/0335734 | A1 | 11/2017 | Tabikh et al. | |
| 2018/0112881 | A1 | 4/2018 | Tabikh et al. | |
| 2020/0284175 | A1 | 9/2020 | Tabikh et al. | |

FOREIGN PATENT DOCUMENTS

| | | | |
|---|---|---|---|
| JP | 2015-532705 | A | 11/2015 |
| JP | 2019-521269 | A | 7/2019 |
| JP | 2020-522637 | A | 7/2020 |
| JP | 2020-535341 | A | 12/2020 |

OTHER PUBLICATIONS

Written Opinion dated Jul. 26, 2022, issued in counterpart Application No. PCT/JP2022/021864, with English translation. (7 pages).

* cited by examiner

COMBUSTION GAS COOLING DEVICE

TECHNICAL FIELD

The present disclosure relates to a combustion gas cooling device.

BACKGROUND ART

In the related art, a denitration apparatus is known which prevents an adverse effect on an atmosphere environment by decomposing nitrogen oxide contained in a combustion gas discharged from a combustion engine such as a gas turbine. In addition, the following disadvantage is known. When the combustion gas whose temperature exceeds an allowable temperature flows into the denitration apparatus including a catalyst unit for decomposing the nitrogen oxide, performance of the denitration apparatus may deteriorate, or a failure of the denitration apparatus may occur. A denitration apparatus is known in which a cooling device for cooling the combustion gas is provided on an upstream side of the catalyst unit to prevent this disadvantage (for example, refer to PTL 1 and PTL 2).

CITATION LIST

Patent Literature

[PTL 1] U.S. Pat. No. 9,890,672
[PTL 2] U.S. Pat. No. 9,644,511

SUMMARY OF INVENTION

Technical Problem

In the denitration apparatus disclosed in PTL 1 and PTL 2, a mixing duct for mixing a cooling gas with the combustion gas has a shape in which a cross-sectional area gradually expands from an upstream side to a downstream side in a circulation direction of the combustion gas. However, the combustion gas flowing into the mixing duct linearly flows along the circulation direction. Therefore, the combustion gas is less likely to spread to a vicinity of an end portion in a width direction (direction orthogonal to the circulation direction) of the mixing duct whose cross-sectional area gradually expands. Therefore, a temperature in the vicinity of the end portion in the width direction of the mixing duct is lower than a temperature in a central portion of the mixing duct, and temperature distribution deviates in the width direction.

A mixed gas in which the combustion gas and the cooling gas are mixed is guided to the catalyst unit via an expansion duct. However, in order that the catalyst unit achieves desired performance, it is necessary to set a maximum temperature of the mixed gas guided to the catalyst unit within a proper temperature range of the catalyst unit. As the temperature distribution greatly deviates in the width direction, the maximum temperature of the mixed gas becomes higher, and it is necessary to increase a flow rate of the cooling gas required for lowering the temperature of the combustion gas within the proper temperature range of the catalyst unit. In order to increase the flow rate of the cooling gas, it is necessary to increase the number of fans for supplying the cooling gas or to provide a high-performance fan. Consequently, manufacturing costs of the denitration apparatus increase.

The present disclosure is made in view of the above-described circumstances, and an object of the present disclosure is to provide a combustion gas cooling device which enables a catalyst unit to achieve desired performance without increasing manufacturing costs.

Solution to Problem

According to an aspect of the present disclosure, there is provided a combustion gas cooling device including a first duct including a first inlet into which a combustion gas flows, and a first outlet through which the combustion gas flowing in from the first inlet flows out, a cooling duct that causes a cooling gas having a temperature lower than a temperature of the combustion gas to flow out into the first duct, and generates a mixed gas in which the combustion gas and the cooling gas are mixed, and a second duct including a second inlet connected to the first duct and into which the mixed gas flows, and a second outlet through which the mixed gas flowing in from the second inlet flows out. The first duct has a shape whose cross-sectional area is equal at each position from the first inlet toward the first outlet. The second duct has a shape whose cross-sectional area gradually expands from the second inlet toward the second outlet.

Advantageous Effects of Invention

According to the present disclosure, it is possible to provide a combustion gas cooling device which enables a catalyst unit to achieve desired performance without increasing manufacturing costs.

DESCRIPTION OF EMBODIMENTS

Figure 1:
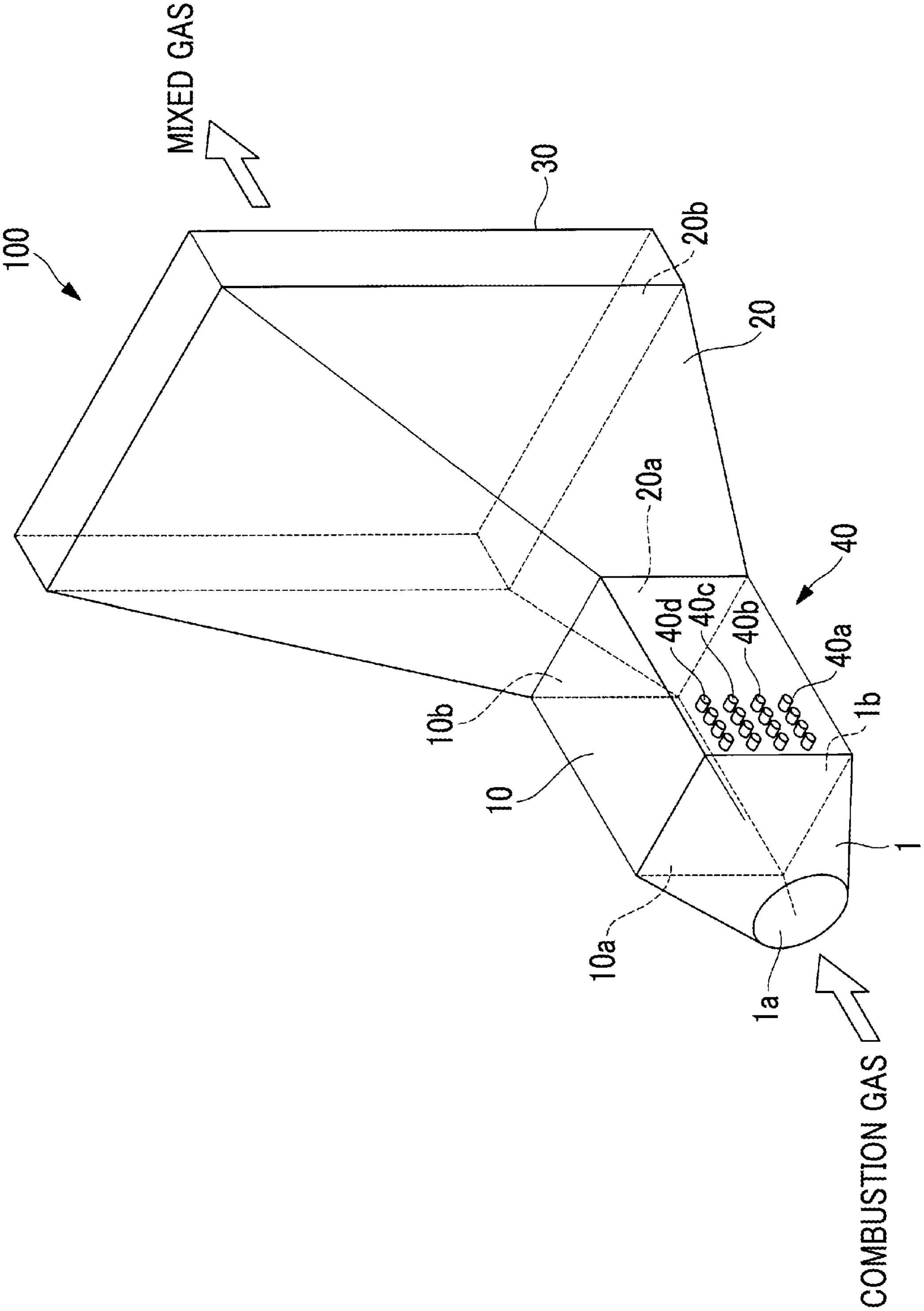
FIG. 1 is a perspective view illustrating a denitration apparatus according to an embodiment of the present disclosure.
Figure 2:
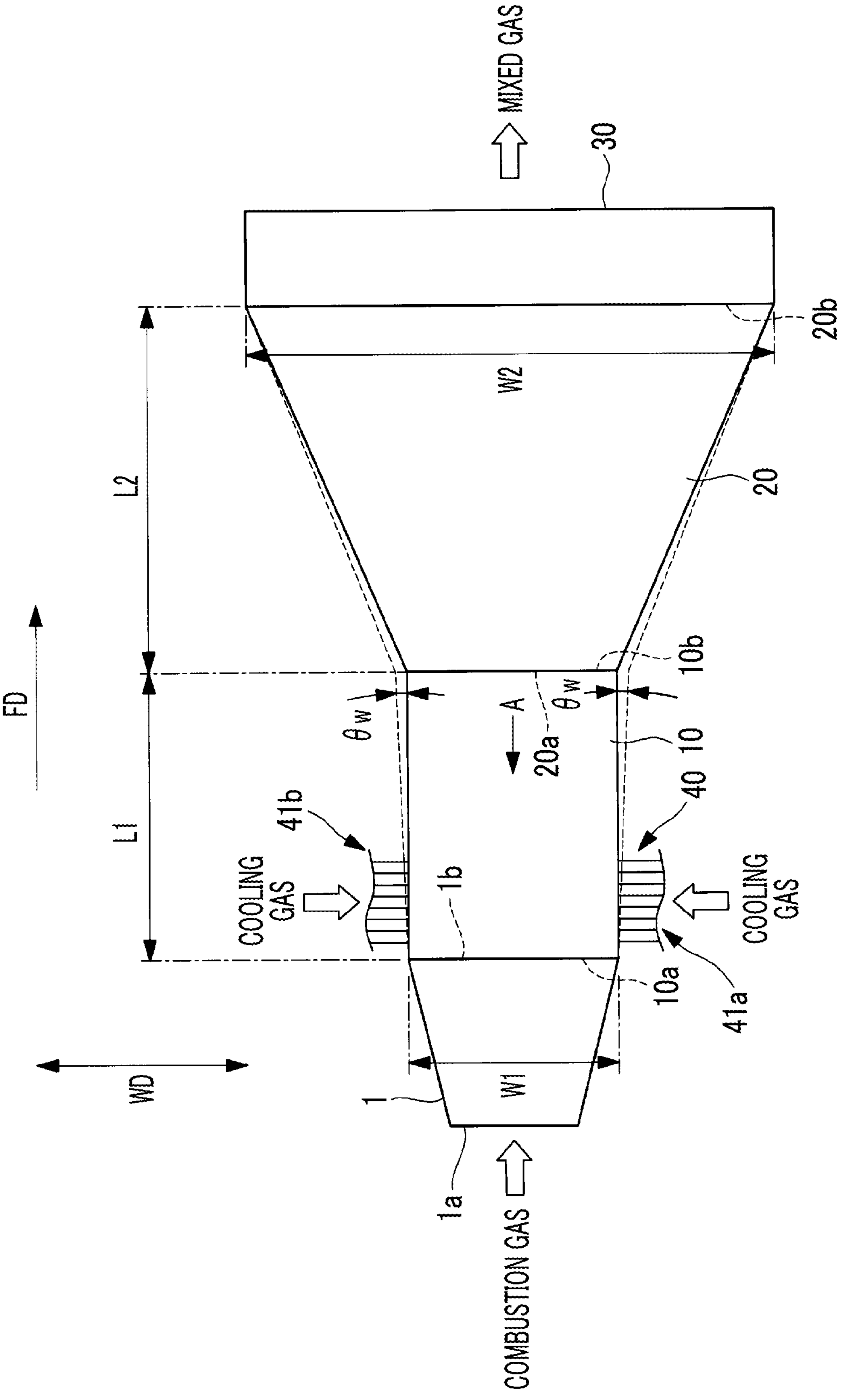
FIG. 2 is a plan view when the denitration apparatus according to the embodiment of the present disclosure is viewed from above.
Figure 3:
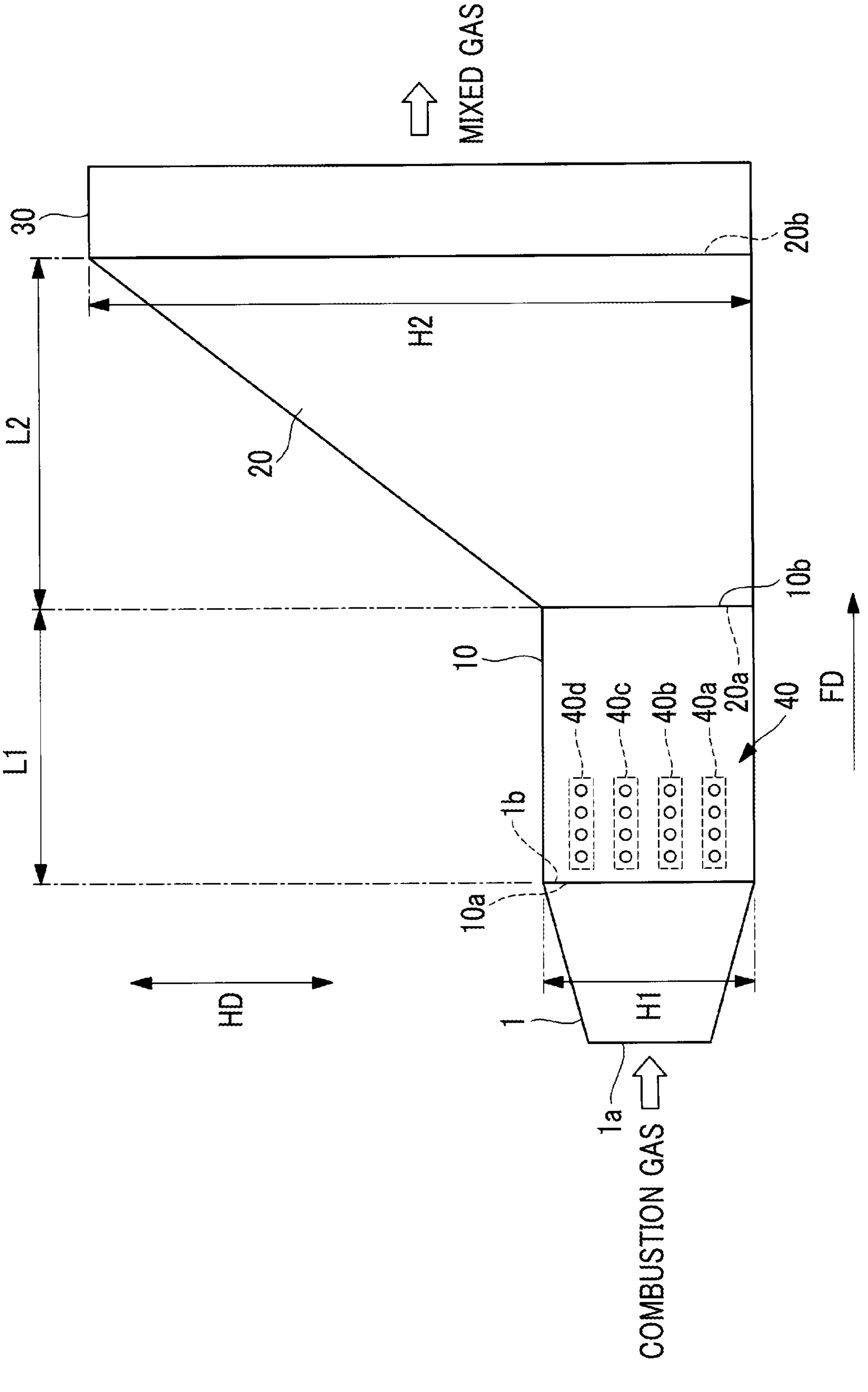
FIG. 3 is a side view when the denitration apparatus according to the embodiment of the present disclosure is viewed from a side.

Hereinafter, a denitration apparatus (combustion gas cooling device) 100 according to an embodiment of the present disclosure will be described with reference to the drawings. FIG. 1 is a perspective view illustrating the denitration apparatus 100 according to the present embodiment. FIG. 2 is a plan view when the denitration apparatus 100 according to the present embodiment is viewed from above. FIG. 3 is a side view when the denitration apparatus 100 according to the present embodiment is viewed from a side. Arrows illustrated in FIGS. 1 to 3 indicate a circulation direction of a gas (combustion gas and mixed gas).

As illustrated in FIG. 1, the denitration apparatus 100 of the present embodiment is an apparatus in which a combustion gas (exhaust gas) having a high temperature of 550° C. or higher generated by combustion in a gas turbine (not illustrated), for example, is caused to flow in from an inlet duct 1, the combustion gas and a cooling gas are mixed inside a mixing duct 10 to generate a mixed gas, and the mixed gas passing through an expansion duct 20 is caused to flow into a catalyst unit 30.

As illustrated in FIGS. 1 to 3, the denitration apparatus 100 includes the inlet duct 1, the mixing duct (first duct) 10, the expansion duct (second duct) 20, the catalyst unit 30, and a cooling duct 40.

The inlet duct 1 is formed of a metal material such as iron or a heat-resistant material, and functions as a circulation flow path for the combustion gas. The inlet duct 1 includes an inlet 1*a* into which the combustion gas discharged from the gas turbine flows, and an outlet 1*b* through which the combustion gas flowing into the inlet 1*a* flows out. For example, the inlet 1*a* has a substantially circular cross-sectional shape in a direction orthogonal to a circulation direction FD of the combustion gas.

On the other hand, the outlet 1*b* has a rectangular cross-sectional shape in a direction orthogonal to the circulation direction FD of the combustion gas. The inlet duct 1 has a shape whose cross-sectional area in the direction orthogonal to the circulation direction FD of the combustion gas gradually expands from the inlet 1*a* toward the outlet 1*b*. For example, a flow velocity of the combustion gas discharged from the gas turbine inside the inlet duct 1 is from 50 m/s to 100 m/s.

The mixing duct 10 is formed of a metal material such as iron or a heat-resistant material, and functions as a circulation flow path for the mixed gas in which the combustion gas and the cooling gas are mixed. The mixing duct 10 includes an inlet (first inlet) 10*a* into which the combustion gas discharged from the outlet 1*b* of the inlet duct 1 flows, and an outlet (first outlet) 10*b* through which the combustion gas flowing in from the inlet 10*a* flows out.

The inlet 10*a* and the outlet 10*b* have a rectangular cross-sectional shape in the direction orthogonal to the circulation direction FD of the combustion gas. The inlet 10*a* of the mixing duct 10 has the same shape as the outlet 1*b* of the inlet duct 1, and is connected so that a leakage of the combustion gas does not occur. The cross-sectional shapes of the inlet 10*a* and the outlet 10*b* are not limited to the rectangular shape, and may be an elliptical shape or a circular shape.

As illustrated in FIG. 2, in the mixing duct 10, a length in a width direction WD orthogonal to the circulation direction FD of the combustion gas is constant at W1 from the inlet 10*a* to the outlet 10*b*. In addition, as illustrated in FIG. 3, in the mixing duct 10, a length in a height direction HD orthogonal to the circulation direction FD of the combustion gas is constant at H1 from the inlet 10*a* to the outlet 10*b*. Therefore, the mixing duct 10 has a shape whose cross-sectional area is equal at each position from the inlet 10*a* toward the outlet 10*b*.

The mixing duct 10 has a shape in which the length in the width direction WD is constant at W1 and the length in the height direction HD is constant at H1. However, any other shape may be used as long as a cross-sectional area at each position from the inlet 10*a* toward the outlet 10*b* has a substantially equal shape. For example, the mixing duct 10 may have a shape in which the length in the height direction HD is constant at H1 and the length in the width direction WD slightly increases from the inlet 10*a* toward the outlet 10*b*. As illustrated by a dotted line in FIG. 2, for example, the mixing duct 10 may have a shape in which both end portions in the width direction WD with respect to the circulation direction FD of the combustion gas have an angle θw and the length in the width direction WD increases. Here, the angle θw is set to an angle larger than 0° and smaller than 8°.

The expansion duct 20 is formed of a metal material such as iron or a heat-resistant material, and functions as a circulation flow path of the mixed gas in which the combustion gas and the cooling gas are mixed. The expansion duct 20 includes an inlet (second inlet) 20*a* into which the combustion gas discharged from the outlet 10*b* of the mixing duct 10 flows, and an outlet (second outlet) 20*b* through which the combustion gas flowing into the inlet 20*a* flows out.

The inlet 20*a* has a rectangular cross-sectional shape in a direction substantially orthogonal to the circulation direction FD of the combustion gas. The outlet 20*b* has a vertically long rectangular cross-sectional shape in the direction substantially orthogonal to the circulation direction FD of the combustion gas. The inlet 20*a* of the expansion duct 20 has the same shape as the outlet 10*b* of the mixing duct 10, and is connected so that a leakage of the mixed gas does not occur. The cross-sectional shapes of the inlet 20*a* and the outlet 20*b* are not limited to a square shape or a rectangular shape, and may be an elliptical shape or a circular shape.

As illustrated in FIG. 2, the expansion duct 20 has a shape in which the length in the width direction WD orthogonal to the circulation direction FD of the combustion gas gradually increases with a constant gradient from W1 to W2, from the inlet 20*a* to the outlet 20*b*. In addition, as illustrated in FIG. 3, in the expansion duct 20 has a shape in which the length in the height direction HD orthogonal to the circulation direction FD of the combustion gas gradually increases with a constant gradient from H1 to H2, from the inlet 20*a* to the outlet 20*b*. Therefore, the expansion duct 20 has a shape in which the cross-sectional area gradually expands with a constant gradient from the inlet 20*a* toward the outlet 20*b*.

As illustrated in FIG. 2, in the circulation direction FD of the combustion gas, the mixing duct 10 has a length L1, and the expansion duct 20 has a length L2. It is desirable that the length L1 and the length L2 are set to satisfy the following equation (1).

$$0.5 \leq L1/L2 \leq 1.5 \tag{1}$$

The catalyst unit 30 decomposes nitrogen oxide contained in the mixed gas, and discharges the mixed gas in which the nitrogen oxide is decomposed, to the outside (in the atmosphere) of the denitration apparatus 100. In the expansion duct 20, a blowing unit (not illustrated) for blowing a reducing agent for causing a reduction reaction of the mixed gas passing through the catalyst unit 30 into the expansion duct 20 is disposed. For example, the blowing unit includes a circular pipe-shaped flow path provided with a plurality of holes, and blows ammonia passing through the flow path into the expansion duct 20 via the plurality of holes. Although the ammonia is a typical example of the reducing agent, other types of the reducing agent can also be used. Then, the mixed gas into which the reducing agent is blown by the blowing unit flows into the catalyst unit 30 via the outlet 20*b* of the expansion duct 20.

The catalyst unit 30 functions as a denitration apparatus that decomposes the nitrogen oxide contained in the combustion gas into which the reducing agent is blown by the blowing unit, into water and nitrogen. In the first embodiment, a selective catalytic reduction (SCR) method for decomposing the nitrogen oxide by using ammonia as the reducing agent is used.

As in the mixing duct 10 and the expansion duct 20, the catalyst unit 30 is formed of the metal material such as iron or the heat-resistant material, and functions as a circulation flow path of the mixed gas in which the combustion gas and the cooling gas are mixed. The catalyst unit 30 is different from the mixing duct 10 and the expansion duct 20 in that a plurality of catalyst packs (not illustrated) are laid and disposed in the flow path. The catalyst pack is a catalyst member filled with a catalyst for decomposing the nitrogen oxide (nitrogen monoxide or nitrogen dioxide) in an exhaust gas into the water and the nitrogen by causing the mixed gas to react with the ammonia. The catalyst pack includes a grid-shaped or plate-shaped catalyst so that the mixed gas can internally circulate. A main component of the catalyst is $TiO_2$, and vanadium or tungsten which is an active component is added.

It is preferable that a temperature at which the catalyst promotes the reaction of decomposing the mixed gas into the nitrogen and the water is 300° C. or higher and 500° C. or lower, and particularly, it is more preferable that the temperature falls within a range of 300° C. or higher and 470° C. or lower. In a region lower than 300° C., activity of the catalyst is lowered, and a larger amount of the catalyst is required for improving denitration performance. On the other hand, when the temperature is higher than 470° C., the ammonia ($NH_3$) is oxidized, and the ammonia ($NH_3$) is reduced accordingly, thereby causing a problem in that the denitration performance may deteriorate. In addition, when the temperature is as high as 500° C. or higher, the temperature is not suitable for reduction reaction. Moreover, the exceeds temperature a heat-resistant temperature of the catalyst itself, thereby causing a possibility that the catalyst may be damaged. Therefore, it is preferable that the temperature of the mixed gas supplied to the catalyst is 500° C. or lower, and particularly, it is more preferable that the temperature falls within a range of 300° C. or higher and 470° ° C. or lower.

The cooling duct 40 is formed of the metal material such as iron or the heat-resistant material, and generates the mixed gas in which the combustion gas and the cooling gas are mixed, by causing the cooling gas having a temperature lower than that of the combustion gas to flow out into the mixing duct 10. In the present embodiment, for example, four cooling ducts (40*a*, 40*b*, 40*c*, and 40*d* in this order from below) are disposed at an interval in the height direction of the mixing duct 10.

In the present embodiment, the mixing ducts 10 are disposed at an interval in the height direction, but the present invention is not limited thereto. For example, the mixing ducts 10 may be disposed in a direction intersecting with the circulation direction FD of the combustion gas, such as a case of being disposed at an interval in the width direction of the mixing duct 10. As the cooling gas, various gases having a temperature lower than that of the combustion gas can be used. However, in the present embodiment, air in the atmosphere is used as the cooling gas. Hereinafter, when the four cooling ducts are described without being distinguished, a reference numeral 40 will be assigned. When each cooling duct is distinguished and described, any one of a reference numeral 40*a*, a reference numeral 40*b*, a reference numeral 40*c*, and a reference numeral 40*d* will be assigned for the description.

As illustrated in FIG. 2, the cooling duct 40 includes cooling gas inlets 41*a* and 41*b* in two directions substantially orthogonal to the circulation direction FD of the combustion gas, and the cooling gas flows in from the two cooling gas inlets 41*a* and 41*b*. Each of the two cooling gas inlets is connected to a connecting duct (not illustrated) including an air fan (not illustrated) inside the flow path. The air fan causes the air in the atmosphere to flow into the connecting duct by driving power of a motor, and guides the air functioning as the cooling gas to the cooling gas inlets 41*a* and 41*b* via the connecting duct.

Figure 4:
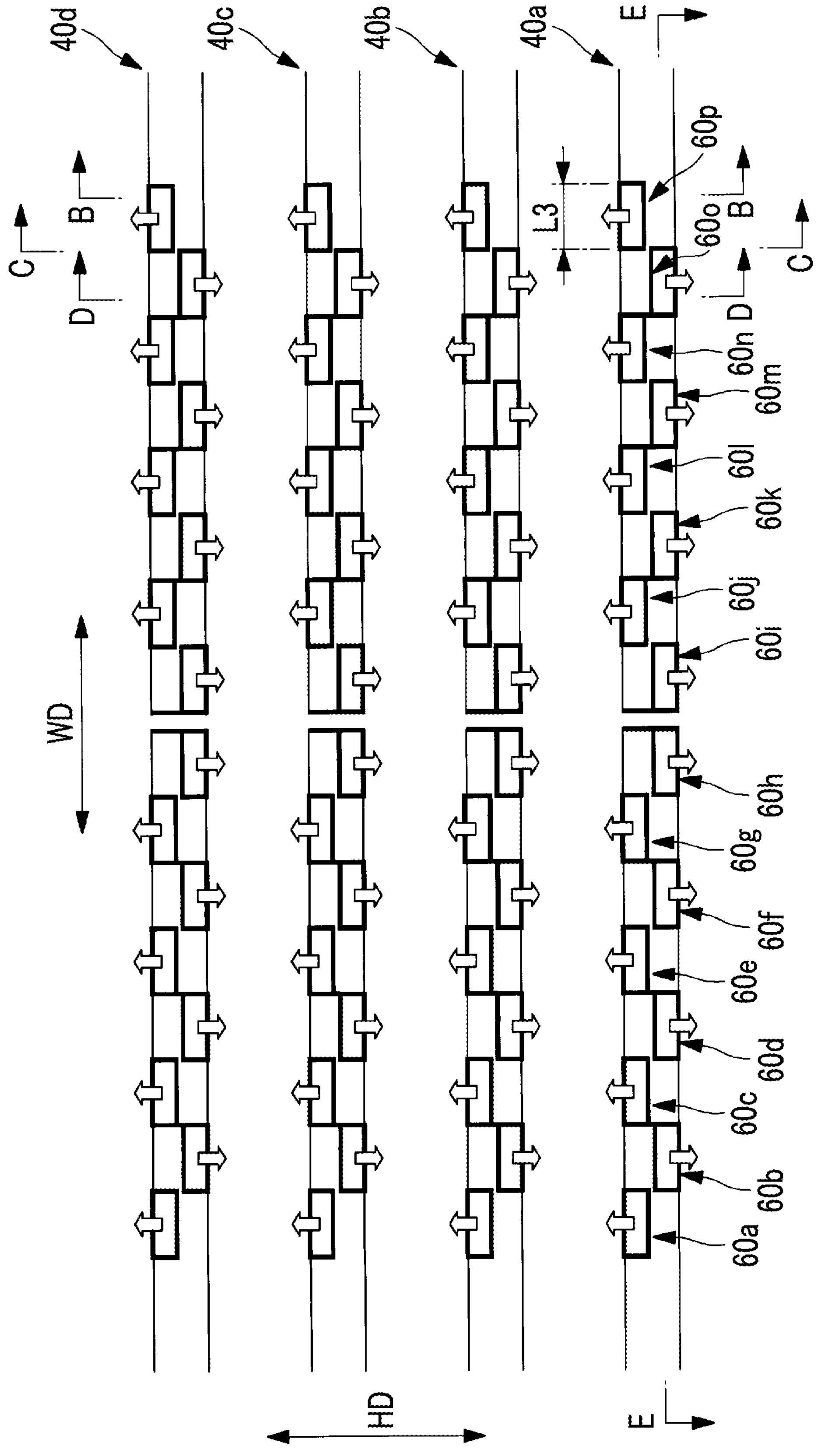
FIG. 4 is a front view when a cooling duct is viewed in a direction of an arrow A in FIG. 2.

FIG. 4 is a front view when the cooling duct 40 is viewed in a direction of an arrow A in FIG. 2. As illustrated in FIG. 4, four cooling ducts 40*a*, 40*b*, 40*c*, and 40*d* are disposed at a regular interval along the height direction HD of the mixing duct 10. Each cooling duct 40 is fixed to a side wall surface of the mixing duct 10 with a bolt. The four cooling ducts 40*a*, 40*b*, 40*c*, and 40*d* are not necessarily disposed at a regular interval in the height direction, and the interval thereof may be changed.

Each cooling duct 40 is provided with a plurality of cooling gas injection holes 60 at different positions in a longitudinal direction (width direction WD of the mixing duct 10) of the cooling duct 40. When the cooling duct 40*a* is described, the cooling duct 40*a* is provided with 16 cooling gas injection holes 60*a* to 60*p* at different positions in the longitudinal direction of the cooling duct 40*a*. As illustrated in FIG. 4, the cooling gas injection hole (opening hole) 60 has a length L3 along the width direction WD.

Out of the 16 cooling gas injection holes, eight of the cooling gas injection holes 60*b*, 60*d*, 60*f*, 60*h*, 60*i*, 60*k*, 60*m*, and 60*o* (first cooling gas outlets) are open downward in the height direction HD of the mixing duct 10. On the other hand, eight cooling gas injection holes 60*a*, 60*c*, 60*e*, 60*g*, 60*j*, 601, 60*n*, and 60*p* (second cooling gas outlets) are open upward in the height direction HD.

As indicated by an arrow in FIG. 4, the cooling gas flows out downward in the height direction HD from the cooling gas injection holes 60*b*, 60*d*, 60*f*, 60*h*, 60*i*, 60*k*, 60*m*, and 60*o* which are open downward in the height direction HD of the mixing duct 10. On the other hand, the cooling gas flows out upward in the height direction HD from the cooling gas injection holes 60*a*, 60*c*, 60*e*, 60*g*, 60*j*, 601, 60*n*, and 60*p* which are open upward in the height direction HD of the mixing duct 10.

The plurality of cooling gas injection holes 60*a* to 60*p* include cooling gas injection holes which are open in different directions. In addition, the cooling gas injection hole open downward in a vertical direction (height direction of the mixing duct 10) and the cooling gas injection hole open upward in the height direction HD of the mixing duct 10 are alternately disposed along the width direction WD orthogonal to the circulation direction FD of the combustion gas.

Since the plurality of cooling gas injection holes 60*a* to 60*p* are alternately disposed along the width direction WD, mixing between the cooling gas and the combustion gas can be promoted, and the temperature distribution of the mixed gas supplied to the catalyst unit 30 can be uniform in the width direction WD. The number of cooling gas injection holes open upward in the height direction HD of the mixing duct 10 is not limited to eight, and the number of the cooling gas injection holes open downward in the height direction HD of the mixing duct 10 is not limited to eight.

Figure 5:
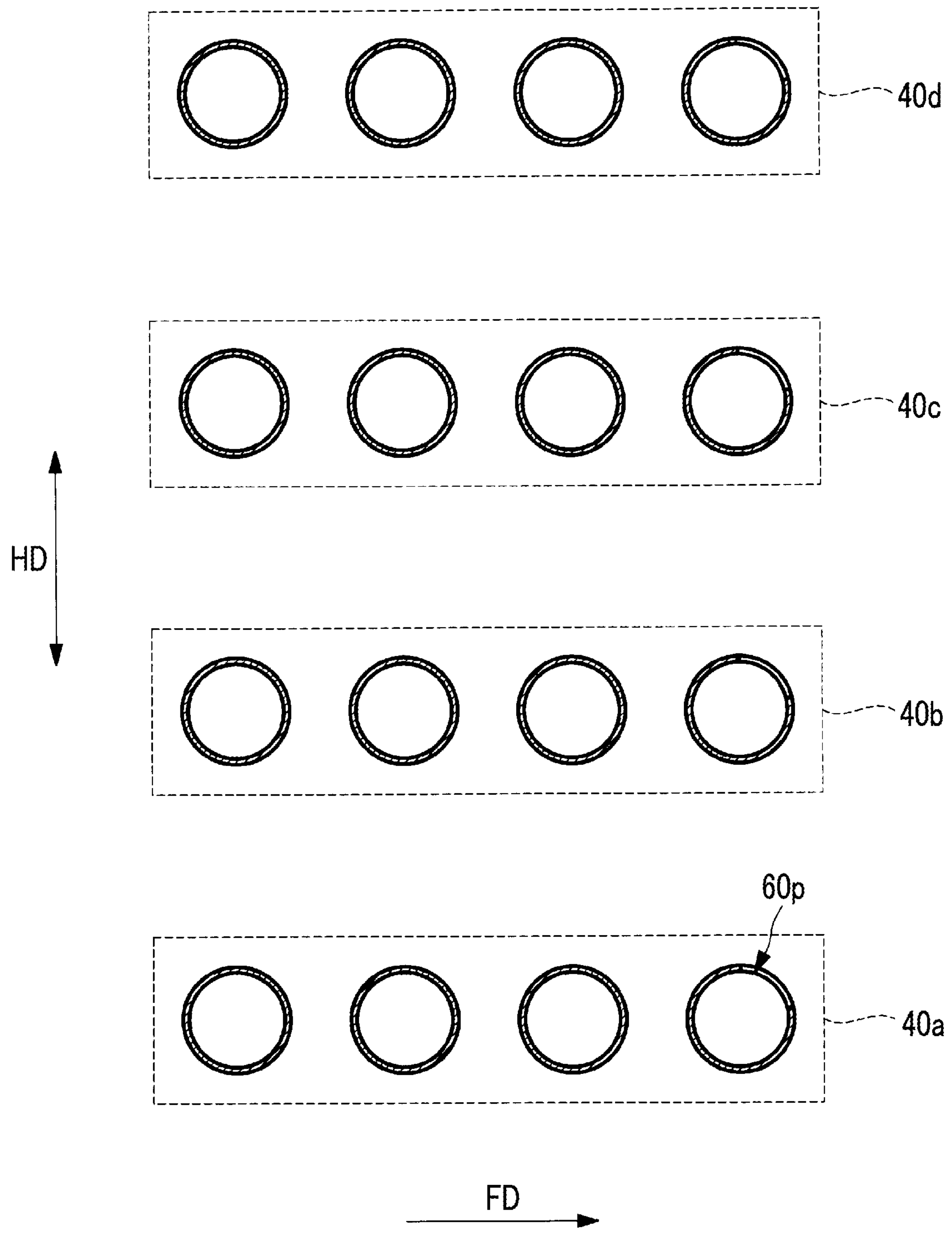
FIG. 5 is a sectional view taken along an arrow line B-B of the cooling duct illustrated in FIG. 4.
Figure 6:
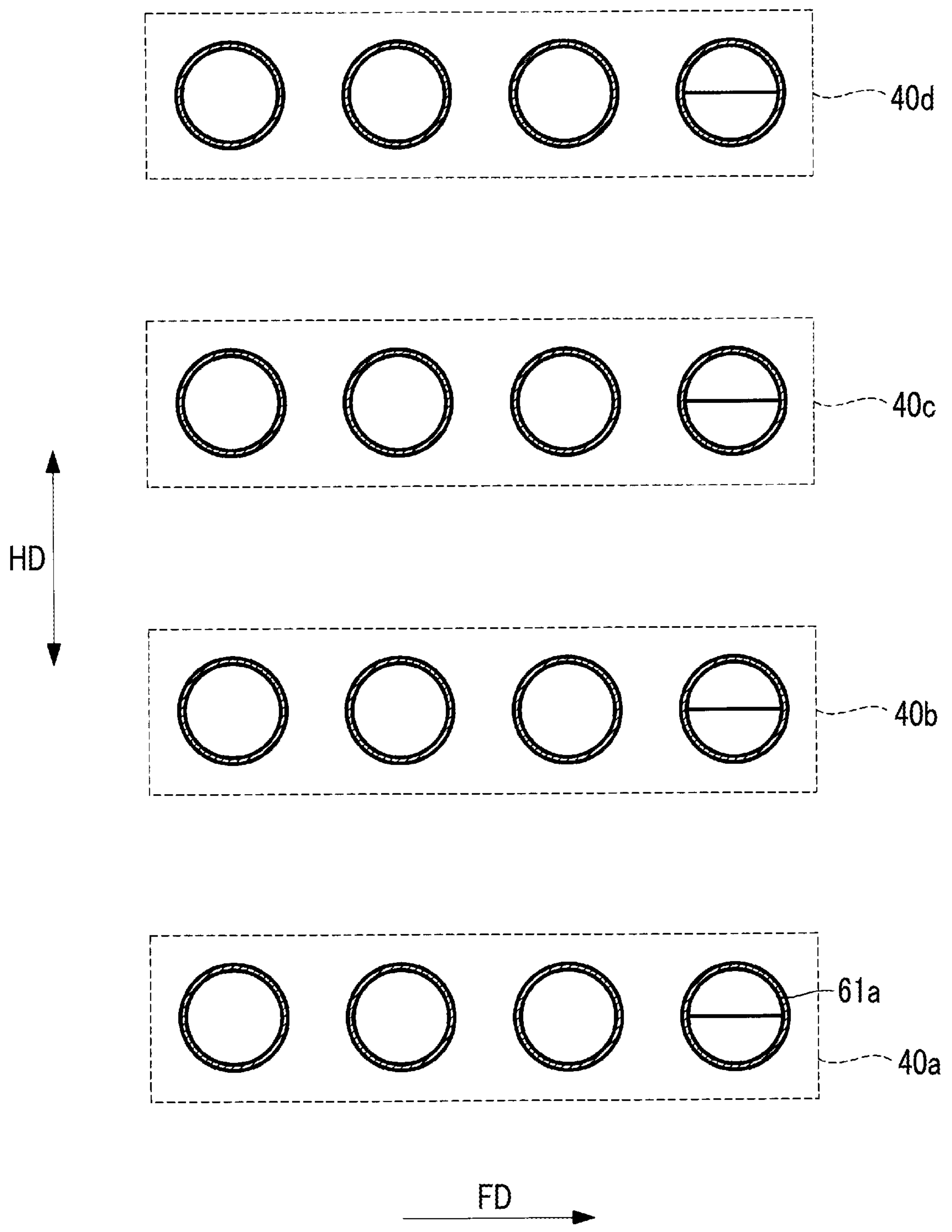
FIG. 6 is a sectional view taken along an arrow line C-C of the cooling duct illustrated in FIG. 4.
Figure 7:
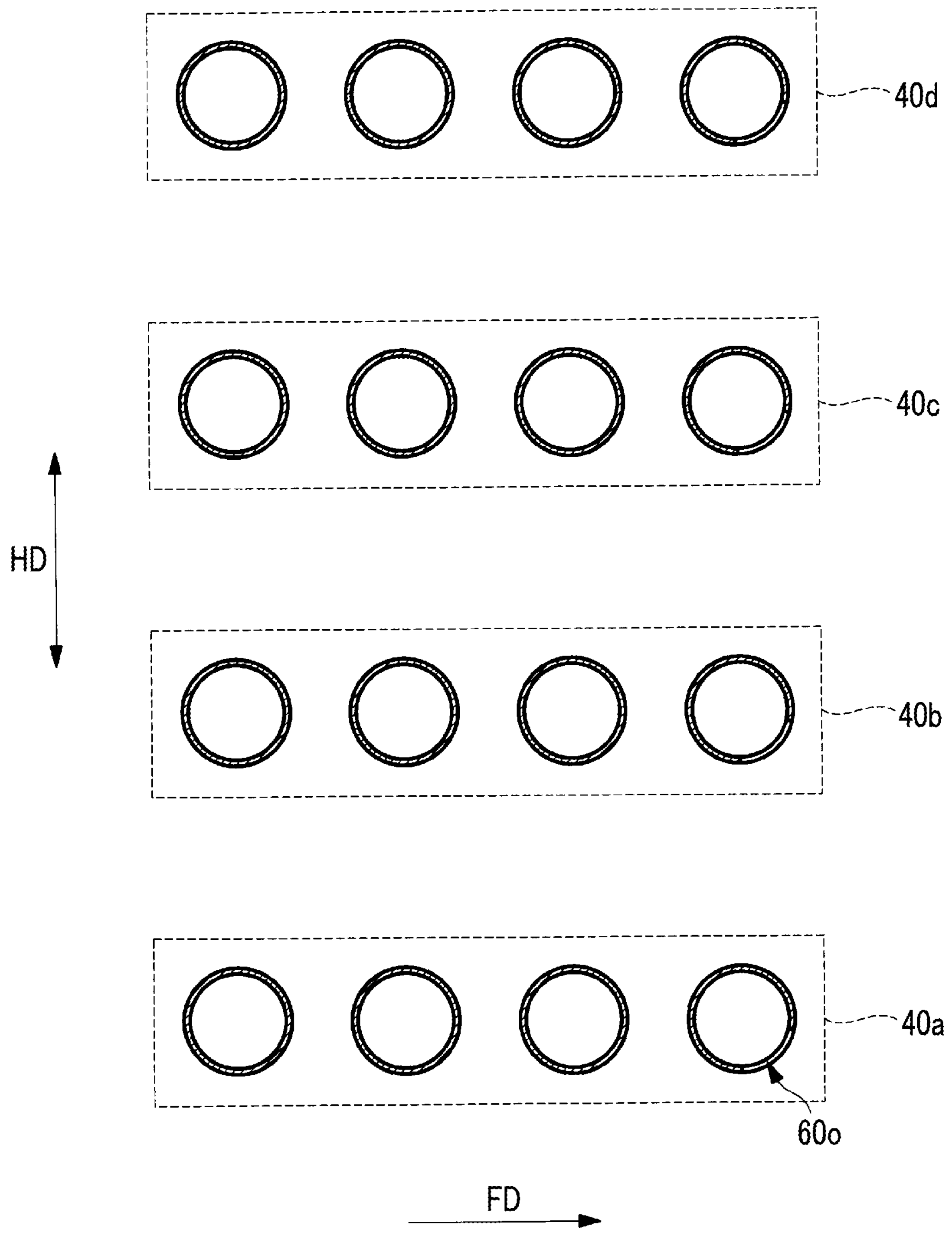
FIG. 7 is a sectional view taken along an arrow line D-D of the cooling duct illustrated in FIG. 4.
Figure 8:
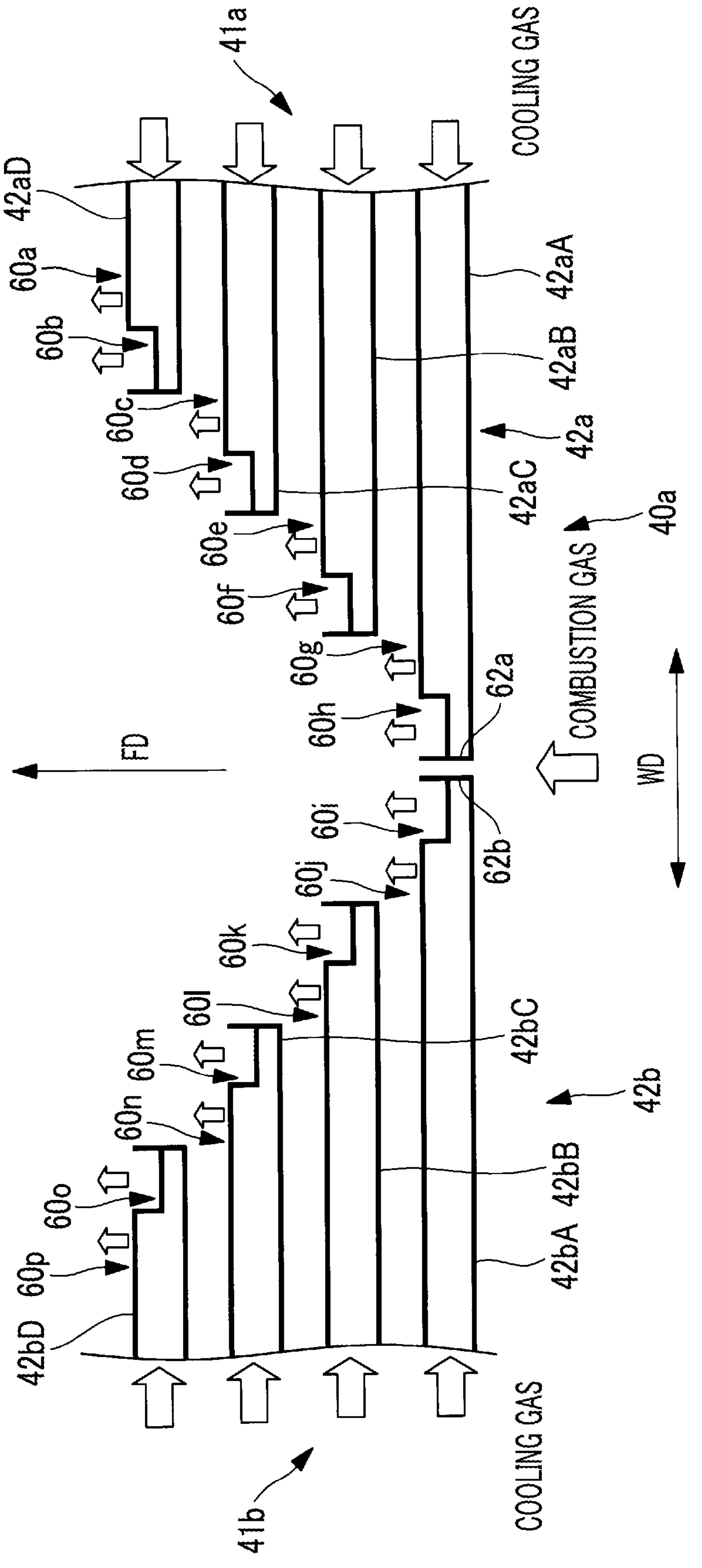
FIG. 8 is a sectional view taken along an arrow line E-E of the cooling duct illustrated in FIG. 4.

FIG. 5 is a sectional view taken along an arrow line B-B of the cooling duct 40 illustrated in FIG. 4. FIG. 6 is a sectional view taken along an arrow line C-C of the cooling duct 40 illustrated in FIG. 4. FIG. 7 is a sectional view taken along an arrow line D-D of the cooling duct 40 illustrated in FIG. 4. FIG. 8 is a sectional view taken along an arrow line E-E of the cooling duct 40 illustrated in FIG. 4. As illustrated in FIGS. 5 to 7, the cooling duct 40 is a duct that extends along the width direction WD and is formed by a plurality of circular pipes having a circular cross section orthogonal to the width direction WD.

As illustrated in FIG. 5, the cooling gas flows out obliquely upward in the height direction HD from the cooling gas injection hole 60*p* open upward in the height direction HD of the mixing duct 10. The cooling gas flowing out therefrom includes both a velocity component directed upward in the height direction HD and a velocity component directed in the circulation direction FD of the combustion gas.

In addition, as illustrated in FIG. 7, the cooling gas flows out obliquely downward in the height direction HD from the cooling gas injection hole 60*o* open downward in the height direction HD of the mixing duct 10. The cooling gas flowing out therefrom includes both a velocity component directed downward in the height direction HD and a velocity component directed in the circulation direction FD of the combustion gas.

As illustrated in FIG. 6, a partition plate 61*a* is disposed between the cooling gas injection hole 60*p* open upward in the height direction HD of the mixing duct 10 and the cooling gas injection hole 60*o* open downward in the height direction HD. The partition plate separates flows of the cooling gases flowing out from the adjacent cooling gas injection holes 60*p* and 60*o* so that the flows are not mixed with each other inside the cooling duct 40. In addition, the cooling gas is equally distributed to the two adjacent cooling gas injection holes 60*p* and 60*o* by the partition plate 61*a*, and the cooling gas having a substantially equal flow rate flows out from each of the cooling gas injection holes 60*p* and 60*o*.

Next, the cooling gas inlets (41*a* and 41*b*), the plurality of cooling gas injection holes (60*a* to 60*p*), and distribution flow paths (42*a* and 42*b*) which are included in the cooling duct 40*a* will be described with reference to FIG. 8. Hereinafter, the cooling duct 40*a* will be described. However, since the other cooling ducts (40*b*, 40*c*, and 40*d*) have the same configuration, description thereof will be omitted below.

FIG. 8 is a sectional view taken along an arrow line E-E of the cooling duct 40*a* illustrated in FIG. 4. The combustion gas circulates along the circulation direction FD in the cooling duct 40*a* illustrated in FIG. 8. The cooling duct 40*a* includes the cooling gas inlets 41*a* and 41*b* in two directions substantially orthogonal to the circulation direction of the combustion gas, and the cooling gas flows in along the width direction WD substantially orthogonal to the circulation direction FD of the combustion gas from the two cooling gas inlets 41*a* and 41*b*. In the cooling duct 40*a*, the plurality of cooling gas injection holes (62*a* to 62*p*) are disposed at positions different from each other in the width direction WD.

The cooling gas flows in a direction (first direction) from a right side to a left side in FIG. 8 from the cooling gas inlet (first cooling gas inlet) 41*a* disposed on the right side in FIG. 8. The cooling gas flowing into the cooling duct 40*a* from the cooling gas inlet 41*a* flows into the distribution flow path (first distribution flow path) 42*a*. The distribution flow path 42*a* is a flow path that extends along the width direction WD and distributes the cooling gas flowing into the cooling gas inlet 41*a* to each of the plurality of cooling gas injection holes (60*a* to 60*h*).

The distribution flow path 42*a* includes four cooling gas flow paths 42*a*A, 42*a*B, 42*a*C, and 42*a*D partitioned by four circular pipes, and each cooling gas flow path forms a mutually independent flow path. In addition, in the distribution flow path 42*a*, the partition plate 61*a* illustrated in FIG. 6 is provided in each of the cooling gas flow paths. The partition plate 61*a* is a plate-shaped member formed of the metal material such as iron or the heat-resistant material, which is disposed substantially horizontally upward in the height direction HD of each cooling gas flow path (circular pipe).

The partition plate 61*a* is joined to each cooling gas flow path by welding so that the cooling gas does not leak in a joined portion. Each cooling gas flow path (circular pipe) is provided with two cooling gas injection holes, and the cooling gas flowing into each cooling gas flow path flows out from the two cooling gas injection holes to the mixing duct 10.

The cooling gas flows in a direction (second direction) from the left side to the right side in FIG. 8 from the cooling gas inlet (second cooling gas inlet) 41*b* disposed on the left side in FIG. 8. The cooling gas flowing into the cooling duct 40*a* from the cooling gas inlet 41*b* flows into the distribution flow path (second distribution flow path) 42*b*. The distribution flow path 42*b* is a flow path that distributes the cooling gas flowing into the cooling gas inlet 41*b* to each of the plurality of cooling gas injection holes (60*i* to 60*p*).

The distribution flow path 42*b* includes four cooling gas flow paths 42*b*A, 42*b*B, 42*b*C, and 42*b*D partitioned by four circular pipes, and each cooling gas flow path forms a mutually independent flow path. In addition, in the distribution flow path 42*b*, a partition plate (not illustrated) similar to the partition plate 61*a* illustrated in FIG. 6 is provided in each of the cooling gas flow paths. The partition plate is a plate-shaped member formed of the metal material such as iron or the heat-resistant material, which is disposed substantially horizontally upward in the height direction HD of each cooling gas flow path (circular pipe).

The partition plate is joined to each cooling gas flow path by welding so that the cooling gas does not leak in a joined portion. Each cooling gas flow path (circular pipe) is provided with two cooling gas injection holes, and the cooling gas flowing into each cooling gas flow path flows out from the two cooling gas injection holes to the mixing duct 10.

The distribution flow path 42*a* and the distribution flow path 42*b* are separated via the partition plates 62*a* and 62*b*. The partition plates 62*a* and 62*b* are plate-shaped members formed of the metal material such as iron or the heat-resistant material disposed substantially horizontally in the cooling gas flow path (circular pipe). The partition plates 62*a* and 62*b* are joined to an inner peripheral surface of the cooling duct 40*a* by welding to block the flow path of the cooling gas flow path (circular pipe), and are configured so that the cooling gas does not leak in joined portions. A gap is provided in advance between the partition plates 62*a* and 62*b* in view of thermal elongation caused by the combustion gas in the cooling duct 40.

Figure 9:
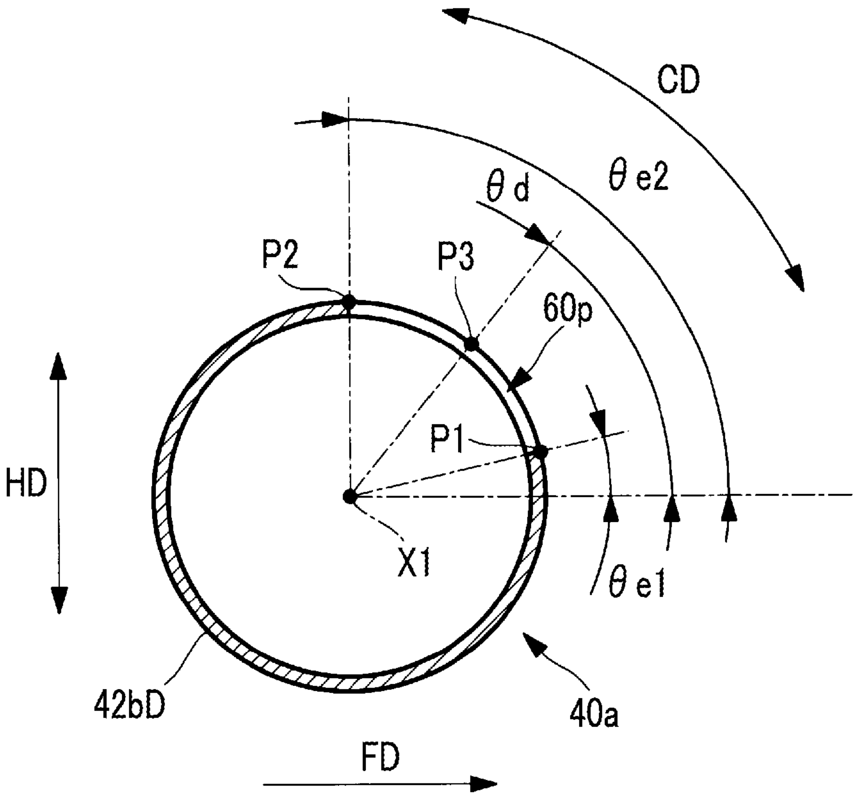
FIG. 9 is a partially enlarged view of a cooling gas flow path forming the cooling duct illustrated in FIG. 5.

Here, a shape of the cooling gas injection hole 60 included in the cooling duct 40 will be described with reference to FIGS. 9 to 11. FIG. 9 is a partially enlarged view of the cooling gas flow path 42*b*D forming the cooling duct 40*a* illustrated in FIG. 5. As illustrated in FIG. 9, the cooling gas flow path 42*b*D is a flow path formed in a circular shape extending along a central axis X1. The cooling gas injection hole 60*p* is formed in the cooling gas flow path 42*b*D. Although the cooling gas injection hole 60*p* is illustrated in FIG. 9, the same applies to the cooling gas injection holes 60*a*, 60*c*, 60*e*, 60*g*, 60*j*, 601, and 60*n*.

As illustrated in FIG. 9, the cooling gas injection hole 60*p* is formed so that the cooling gas flows out into the mixing duct 10 at an inclination angle θd inclined upward with respect to the circulation direction FD in a plane orthogonal to the width direction WD. The cooling gas injection hole 60*p* is formed from a first end portion P1 to a second end portion P2 along a circumferential direction CD around the central axis X1 of the cooling gas flow path 42*b*D. The inclination angle θd is an angle that passes through an intermediate portion P3 of the first end portion P1 and the second end portion P2 in the circumferential direction CD.

In FIG. 9, an angle formed by a straight line passing through the central axis X1 and the first end portion P1 and the circulation direction FD is θe1, and an angle formed by a straight line passing through the central axis X1 and the second end portion P2 and the circulation direction FD is θe2. The inclination angles θd, θe1, and θe2 are set to satisfy the following equation (2).

$$\theta d = (\theta e1 + \theta e2)/2 \quad (2)$$

In addition, θd is set to have a value that satisfies a range of the following equation (3).

$$45° < \theta d < 90° \quad (3)$$

θd is more preferably set to have a value that satisfies a range of the following equation (4).

$$45° < \theta d \leq 60° \quad (4)$$

Figure 10:
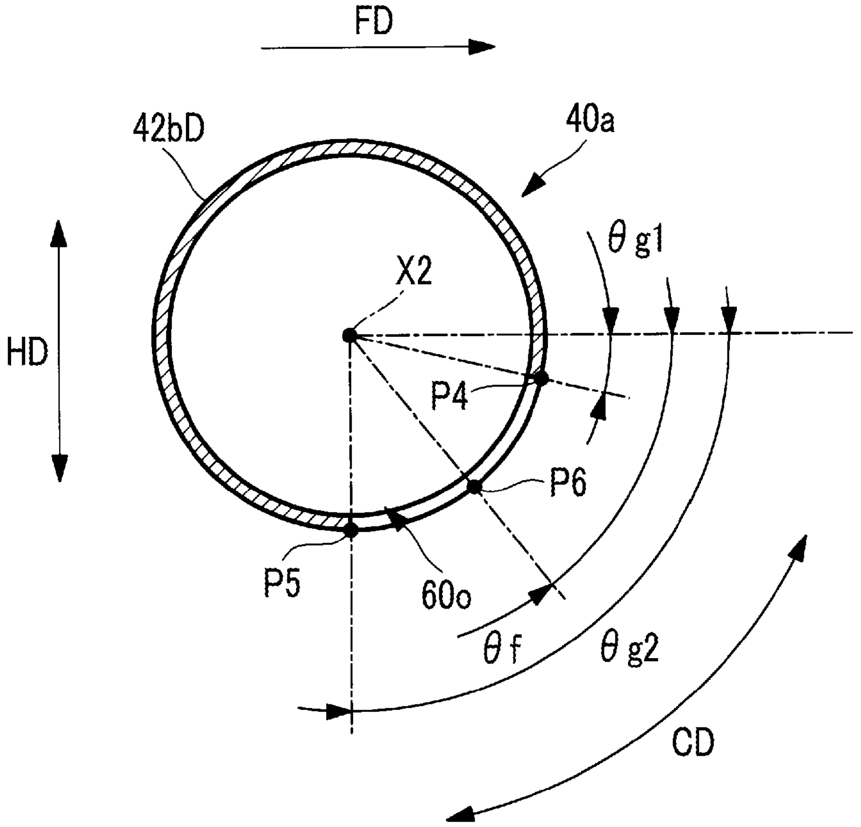
FIG. 10 is a partially enlarged view of a cooling gas flow path forming the cooling duct illustrated in FIG. 7.

FIG. 10 is a partially enlarged view of the cooling gas flow path 42*b*D forming the cooling duct 40*a* illustrated in FIG. 7. As illustrated in FIG. 10, the cooling gas flow path 42*b*D is a flow path formed in a circular shape extending along a central axis X2. The cooling gas injection hole 60*o* is formed in the cooling gas flow path 42*b*D. Although the cooling gas injection hole 60*o* is illustrated in FIG. 10, the same applies to the cooling gas injection holes 60*b*, 60*d*, 60*f*, 60*h*, 60*i*, 60*k*, and 60*m*.

As illustrated in FIG. 10, the cooling gas injection hole 60*o* is formed so that the cooling gas flows out into the mixing duct 10 at an inclination angle θf inclined downward with respect to the circulation direction FD in a plane orthogonal to the width direction WD. The cooling gas injection hole 60*o* is formed from a first end portion P4 to a second end portion P5 along the circumferential direction CD around the central axis X2 of the cooling gas flow path 42*b*D. The inclination angle θf is an angle that passes through an intermediate portion P6 of the first end portion P4 and the second end portion P5 in the circumferential direction CD.

In FIG. 10, an angle formed by a straight line passing through the central axis X2 and the first end portion P4 and the circulation direction FD is θg1, and an angle formed by a straight line passing through the central axis X2 and the second end portion P5 and the circulation direction FD is θg2. The inclination angles θf, θg1, and θg2 are set to satisfy the following equation (5).

$$\theta f = (\theta g1 + \theta g2)/2 \quad (5)$$

In addition, Of is set to have a value that satisfies a range of the following equation (6).

$$45° < \theta f < 90° \quad (6)$$

Of is more preferably set to a value that satisfies the range of the following equation (7).

$$45° < \theta f \leq 60° \quad (7)$$

Figure 11:
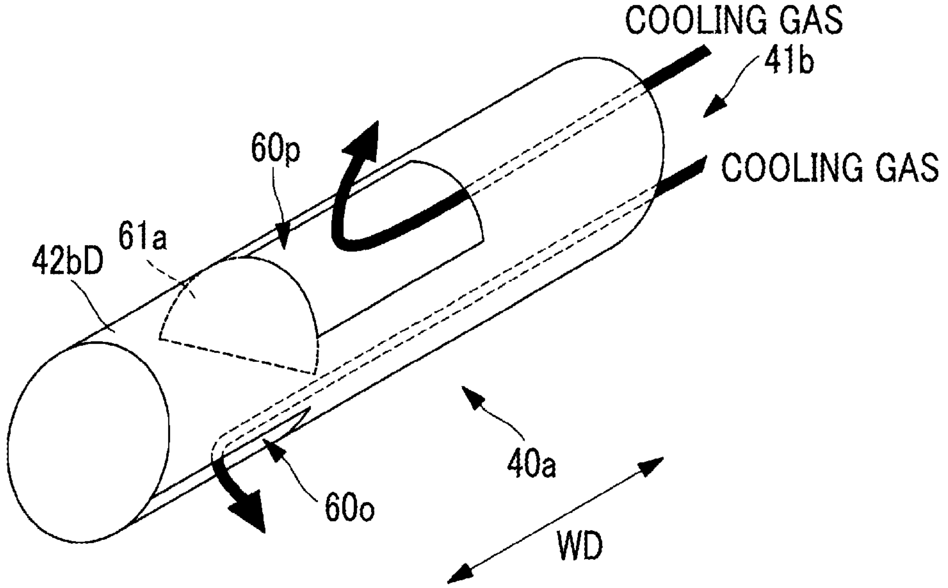
FIG. 11 is a perspective view of the cooling gas flow path illustrated in FIG. 9.

FIG. 11 is a perspective view of the cooling gas flow path 42*b*D illustrated in FIG. 9. As illustrated in FIG. 11, the cooling gas guided from the cooling gas inlet 41*b* to the cooling gas flow path 42*b*D is guided to the cooling gas injection hole 60*o* and the cooling gas injection hole 60*p* along the width direction WD. In the width direction WD, the partition plate 61*a* is disposed on the upper side in the height direction HD between the cooling gas injection hole 60*p* and the cooling gas injection hole 60*o*.

Therefore, the cooling gas circulating on the upper side of the cooling gas flow path 42*b*D abuts on the partition plate 61*a*, and flows out upward from the cooling gas injection hole 60*p* to the mixing duct 10. On the other hand, the cooling gas circulating on the lower side of the cooling gas flow path 42*b*D passes below the partition plate 61*a*, and flows out downward from the cooling gas injection hole 60*o* to the mixing duct 10.

The combustion gas cooling device in the embodiment described above is understood as follows, for example.

According to the present disclosure, the combustion gas cooling device includes the first duct (10) including the first inlet (10*a*) into which the combustion gas flows, and the first outlet (10*b*) through which the combustion gas flowing in from the first inlet flows out, the cooling duct (40) that causes the cooling gas having a temperature lower than a temperature of the combustion gas to flow out into the first duct, and generates the mixed gas in which the combustion gas and the cooling gas are mixed, and the second duct (20) including the second inlet (20*a*) connected to the first duct and into which the mixed gas flows, and the second outlet (20*b*) through which the mixed gas flowing in from the second inlet flows out. The first duct has a shape whose cross-sectional area is equal at each position from the first inlet toward the first outlet. The second duct has a shape whose cross-sectional area gradually expands from the second inlet toward the second outlet.

According to the combustion gas cooling device in the present disclosure, the combustion gas flowing into the first duct from the first inlet and the cooling gas flowing out into the first duct from the cooling duct are mixed, and become the mixed gas having the temperature lower than that of the combustion gas. The first duct has a shape whose cross-sectional area is equal at each position from the first inlet to the first outlet. Therefore, compared to when the first duct has a shape whose cross-sectional area gradually expands, the combustion gas linearly flowing along the circulation direction and the cooling gas are satisfactorily mixed at each position in the width direction orthogonal to the circulation direction. In this manner, the temperature distribution is prevented from deviating in the width direction.

The mixed gas mixed without deviating in the temperature distribution in the width direction inside the first duct flows into the second inlet of the second duct. The mixing is promoted inside the second duct whose cross-sectional area gradually expands, and the mixed gas flows out from the second outlet. In this way, according to the combustion gas cooling device in the present disclosure, the catalyst unit can achieve the desired performance without increasing the manufacturing costs.

In the combustion gas cooling device according to the present disclosure, it is preferable to adopt the following configuration. The cooling duct includes the cooling gas inlets (41*a* and 41*b*) into which the cooling gas flows, the plurality of cooling gas outlets (60*a* to 60*p*) through which the cooling gas flowing in from the cooling gas inlet flows out into the first duct, and the cooling gas flow paths (42*a*A, 42*a*B, 42*a*C, 42*a*D, 42*b*A, 42*b*B, 42*b*C, and 42*b*D) that extend along the width direction (WD) intersecting with the circulation direction of the combustion gas, and guides the cooling gas from the cooling gas inlet to the cooling gas outlet. The cooling gas outlet is formed to cause the cooling gas to flow out into the first duct at the inclination angle larger than 45 degrees and smaller than 90 degrees with respect to the circulation direction in a plane orthogonal to the width direction.

According to the combustion gas cooling device in the present configuration, the plurality of cooling gas outlets through which the cooling gas flows out into the first duct cause the cooling gas to flow out into the first duct at the inclination angle larger than 45 degrees with respect to the circulation direction in the plane orthogonal to the width direction. Therefore, compared to when the inclination angle is 45 degrees or smaller, the angle formed by the circulation direction of the combustion gas and the flowing-out direction of the cooling gas sufficiently increases, and the mixing of the combustion gas and the cooling gas can be sufficiently promoted.

In addition, according to the combustion gas cooling device in the present configuration, the plurality of cooling gas outlets through which the cooling gas flows out into the first duct cause the cooling gas to flow out into the first duct at the inclination angle smaller than 90 degrees with respect to the circulation direction in the plane orthogonal to the width direction. Therefore, compared to when the inclination angle is 90 degrees or more, it is possible to prevent a disadvantage that the combustion gas may flow into the cooling gas outlet.

In the combustion gas cooling device having the above-described configuration, it is preferable that the inclination angle is 60 degrees or smaller.

Since the inclination angle of the cooling gas in the flowing-out direction with respect to the circulation direction is set to 60 degrees or smaller, it is possible to more reliably prevent the disadvantage that the combustion gas may flow into the cooling gas outlet.

In the combustion gas cooling device having the above-described configuration, it is preferable to adopt the following aspect. The cooling duct extends along the width direction, and has a circular cross section orthogonal to the width direction. The cooling gas outlet is an opening hole having a predetermined length along the width direction. The opening hole is formed from the first end portion (P1) to the second end portion (P2) along the circumferential direction around the central axis of the cooling duct. The inclination angle is an angle that passes through the intermediate portion (P3) between the first end portion and the second end portion in the circumferential direction.

According to the combustion gas cooling device of the present aspect, the cooling gas can be mixed with the combustion gas by causing the cooling gas to flow out into the first duct from the opening hole provided in the cooling duct having a circular cross section orthogonal to the width direction. The flowing-out direction of the cooling gas flowing out into the first duct from the opening hole is a direction that passes through the intermediate portion between the first end portion and the second end portion in the circumferential direction of the opening hole. An angle formed by this direction and the circulation direction of the combustion gas is the above-described inclination angle.

According to the present disclosure, the combustion gas cooling device includes the first duct through which the combustion gas circulates, and the cooling duct that causes the cooling gas having a temperature lower than a temperature of the combustion gas to flow out into the first duct, and generates the mixed gas in which the combustion gas and the cooling gas are mixed. The cooling duct includes the cooling gas inlet into which the cooling gas flows, the plurality of cooling gas outlets through which the cooling gas flowing in from the cooling gas inlet flows out into the first duct, and the cooling gas flow path that extends along the width direction intersecting with the circulation direction of the combustion gas, and guides the cooling gas from the cooling gas inlet to the cooling gas outlet. The cooling gas outlet is formed to cause the cooling gas to flow out into the first duct at the inclination angle larger than 45 degrees and smaller than 90 degrees with respect to the circulation direction in the plane orthogonal to the width direction.

According to the combustion gas cooling device in the present disclosure, the combustion gas flowing into the first duct from the first inlet and the cooling gas flowing out into the first duct from the cooling duct are mixed, and become the mixed gas having the temperature lower than that of the combustion gas. The plurality of cooling gas outlets through which the cooling gas flows out into the first duct cause the cooling gas to flow out into the first duct at the inclination angle larger than 45 degrees with respect to the circulation direction in the plane orthogonal to the width direction. Therefore, compared to when the inclination angle is 45 degrees or smaller, the angle formed by the circulation direction of the combustion gas and the flowing-out direction of the cooling gas sufficiently increases, and the mixing of the combustion gas and the cooling gas can be sufficiently promoted.

In addition, according to the combustion gas cooling device in the present disclosure, the plurality of cooling gas outlets through which the cooling gas flows out into the first duct cause the cooling gas to flow out into the first duct at the inclination angle smaller than 90 degrees with respect to the circulation direction in the plane orthogonal to the width direction. Therefore, compared to when the inclination angle is 90 degrees or more, it is possible to prevent a disadvantage that the combustion gas may flow into the cooling gas outlet.

In the combustion gas cooling device having the above-described configuration, it is preferable that the inclination angle is 60 degrees or smaller.

Since the inclination angle of the cooling gas in the flowing-out direction with respect to the circulation direction is set to 60 degrees or smaller, it is possible to more reliably prevent the disadvantage that the combustion gas may flow into the cooling gas outlet.

In the combustion gas cooling device having the above-described configuration, it is preferable to adopt the following aspect. The cooling duct extends along the width direction, and has a circular cross section orthogonal to the width direction. The cooling gas outlet is an opening hole having a predetermined length along the width direction. The opening hole is formed from the first end portion to the second end portion along the circumferential direction around the central axis of the cooling duct. The inclination angle is an angle that passes through the intermediate portion between the first end portion and the second end portion in the circumferential direction.

According to the combustion gas cooling device of the present aspect, the cooling gas can be mixed with the combustion gas by causing the cooling gas to flow out into the first duct from the opening hole provided in the cooling duct having a circular cross section orthogonal to the width direction. The flowing-out direction of the cooling gas flowing out into the first duct from the opening hole is a direction that passes through the intermediate portion between the first end portion and the second end portion in the circumferential direction of the opening hole. An angle formed by this direction and the circulation direction of the combustion gas is the above-described inclination angle.

The combustion gas cooling device according to the present disclosure may be configured to include the catalyst unit that decomposes the nitrogen oxide contained in the mixed gas, and discharges the mixed gas in which the nitrogen oxide is decomposed.

According to the combustion gas cooling device having the present configuration, the catalyst unit can achieve the desired performance without increasing the manufacturing costs.

REFERENCE SIGNS LIST

1: Inlet duct
10: Mixing duct (first duct)
10*a*: Inlet
10*b*: Outlet
20: Expansion duct (second duct)
20*a*: Inlet
20*b*: Outlet
30: Catalyst unit
40, 40*a*, 40*b*, 40*c*, 40*d*: Cooling duct
41*a*, 41*b*: Cooling gas inlet
42*a*, 42*b*: Distribution flow path
42*a*A, 42*a*B, 42*a*C, 42*a*D, 42*b*A, 42*b*B, 42*b*C, 42*b*D: Cooling gas flow path
60: Cooling gas injection hole
61*a*, 62*a*, 62*b*: Partition plate
100: Denitration apparatus (combustion gas cooling device)
CD: Circumferential direction
FD: Circulation direction
HD: Height direction
P1, P4: First end portion
P2, P5: Second end portion
P3, P6: Intermediate portion
WD: Width direction
X1, X2: Central axis
θd, θf: Inclination angle

The invention claimed is:

1. A combustion gas cooling device comprising:
a first duct including a first inlet into which a combustion gas flows, and a first outlet through which the combustion gas flowing in from the first inlet flows out;
a cooling duct that causes a cooling gas having a temperature lower than a temperature of the combustion gas to flow out into the first duct, and generates a mixed gas in which the combustion gas and the cooling gas are mixed; and
a second duct including a second inlet connected to the first duct and into which the mixed gas flows, and a second outlet through which the mixed gas flowing in from the second inlet flows out,
wherein the first duct has a shape whose cross-sectional area is equal at each position from the first inlet toward the first outlet, and
the second duct has a shape whose cross-sectional area gradually expands from the second inlet toward the second outlet.

2. The combustion gas cooling device according to claim 1,
wherein the cooling duct includes
a cooling gas inlet into which the cooling gas flows,
a plurality of cooling gas outlets through which the cooling gas flowing in from the cooling gas inlet flows out into the first duct, and
a cooling gas flow path that extends along a width direction intersecting with a circulation direction of the combustion gas, and guides the cooling gas from the cooling gas inlet to the cooling gas outlet, and
the cooling gas outlet is formed to cause the cooling gas to flow out into the first duct at an inclination angle larger than 45 degrees and smaller than 90 degrees with respect to the circulation direction in a plane orthogonal to the width direction.

3. The combustion gas cooling device according to claim 2,
wherein the inclination angle is 60 degrees or smaller.

4. The combustion gas cooling device according to claim 2,
wherein the cooling duct extends along the width direction, and has a circular cross section orthogonal to the width direction,
the cooling gas outlet is an opening hole having a predetermined length along the width direction,
the opening hole is formed from a first end portion to a second end portion along a circumferential direction around a central axis of the cooling duct, and
the inclination angle is an angle that passes through an intermediate portion between the first end portion and the second end portion in the circumferential direction.

5. The combustion gas cooling device according to claim 1, further comprising:
a catalyst unit that decomposes nitrogen oxide contained in the mixed gas, and discharges the mixed gas in which the nitrogen oxide is decomposed.

6. A combustion gas cooling device comprising:
a first duct through which a combustion gas circulates; and
a cooling duct that causes a cooling gas having a temperature lower than a temperature of the combustion gas to flow out into the first duct, and generates a mixed gas in which the combustion gas and the cooling gas are mixed,
wherein the cooling duct includes
a cooling gas inlet into which the cooling gas flows, a plurality of cooling gas outlets through which the cooling gas flowing in from the cooling gas inlet flows out into the first duct, and a cooling gas flow path that extends along a width direction intersecting with a circulation direction of the combustion gas, and guides the cooling gas from the cooling gas inlet to the cooling gas outlet, and the cooling gas outlet is formed to cause the cooling gas to flow out into the first duct at an inclination angle larger than 45 degrees and smaller than 90 degrees with respect to the circulation direction in a plane orthogonal to the width direction.

7. The combustion gas cooling device according to claim 6, wherein the inclination angle is 60 degrees or smaller.

8. The combustion gas cooling device according to claim 6, wherein the cooling duct extends along the width direction, and has a circular cross section orthogonal to the width direction, the cooling gas outlet is an opening hole having a predetermined length along the width direction, the opening hole is formed from a first end portion to a second end portion along a circumferential direction around a central axis of the cooling duct, and the inclination angle is an angle that passes through an intermediate portion between the first end portion and the second end portion in the circumferential direction.

* * * * *